United States Patent
Funasako et al.

(10) Patent No.: US 6,902,789 B2
(45) Date of Patent: Jun. 7, 2005

(54) TUFTED CARPET AND BACKING FABRIC

(75) Inventors: Nobuhiro Funasako, Osaka (JP); Tomihisa Nadabe, Kyoto (JP); Naoki Tani, Osaka (JP)

(73) Assignees: Ohno Co. Ltd., Sakai (JP); Kawashima-Orimono Co., Ltd, Kyoto (JP); Toyota-Tsusho Co., Ltd., Nagoya (JP)

( * ) Notice: Subject to any disclaimer, the term of this patent is extended or adjusted under 35 U.S.C. 154(b) by 298 days.

(21) Appl. No.: 09/945,255

(22) Filed: Aug. 31, 2001

(65) Prior Publication Data

US 2003/0143907 A1 Jul. 31, 2003

(30) Foreign Application Priority Data

Aug. 31, 2000 (JP) ........................................ 2000-264420

(51) Int. Cl.$^7$ ............................ B32B 5/02; B32B 27/04; B32B 27/12; B32B 33/00; D05C 17/02
(52) U.S. Cl. .............................. 428/95; 428/89; 428/92; 428/96
(58) Field of Search .............................. 428/95, 89, 92, 428/96; 442/2, 43

(56) References Cited

U.S. PATENT DOCUMENTS

| | | | | |
|---|---|---|---|---|
| 3,359,934 A | * | 12/1967 | Schwartz et al. ............ 112/410 |
| 3,613,612 A | * | 10/1971 | Kennedy ..................... 112/260 |
| 3,788,364 A | * | 1/1974 | Dawbarn ................. 139/420 R |
| 3,819,462 A | * | 6/1974 | Starr et al. ...................... 428/93 |
| 3,864,195 A | * | 2/1975 | Patterson ...................... 428/94 |
| 4,123,577 A | * | 10/1978 | Port et al. ...................... 428/95 |
| 4,384,018 A | * | 5/1983 | Caswell et al. ............... 428/95 |
| 4,478,900 A | * | 10/1984 | Nebe et al. ................... 428/92 |
| 4,557,208 A | * | 12/1985 | Ingram et al. ........... 112/80.32 |
| 4,658,739 A | * | 4/1987 | Watkins ..................... 112/80.3 |
| 4,836,118 A | * | 6/1989 | Card et al. ............... 112/80.41 |
| 4,841,886 A | * | 6/1989 | Watkins ..................... 112/80.3 |
| 5,058,518 A | * | 10/1991 | Card et al. ................ 112/80.23 |
| 2003/0035919 A1 | * | 2/2003 | Barkis et al. .................. 428/95 |
| 2003/0084955 A1 | * | 5/2003 | Smith et al. ............ 139/420 A |

FOREIGN PATENT DOCUMENTS

| | | | | |
|---|---|---|---|---|
| EP | 997562 A2 | * | 5/2000 | ............ D03D/9/00 |
| JP | 54-82168 | | 10/1977 | |
| JP | 2-47875 | | 2/1983 | |
| JP | 2-111372 | | 12/1988 | |
| JP | 2727097 | | 12/1988 | |

* cited by examiner

Primary Examiner—Cheryl A. Juska
(74) Attorney, Agent, or Firm—Darby & Darby

(57) ABSTRACT

A carpet which is suitable for use in a vehicular passageway, includes a backing fabric that is woven by using the multi-filament yarns for the warps and wefts. A binding resin is applied to the filaments which compose the weft. The filaments which make up the weft are partially fixed to one another through the binding resin. The warp and the weft are partially fixed through the binding resin sticking on the filament of the weft before the tufting process.

5 Claims, 7 Drawing Sheets

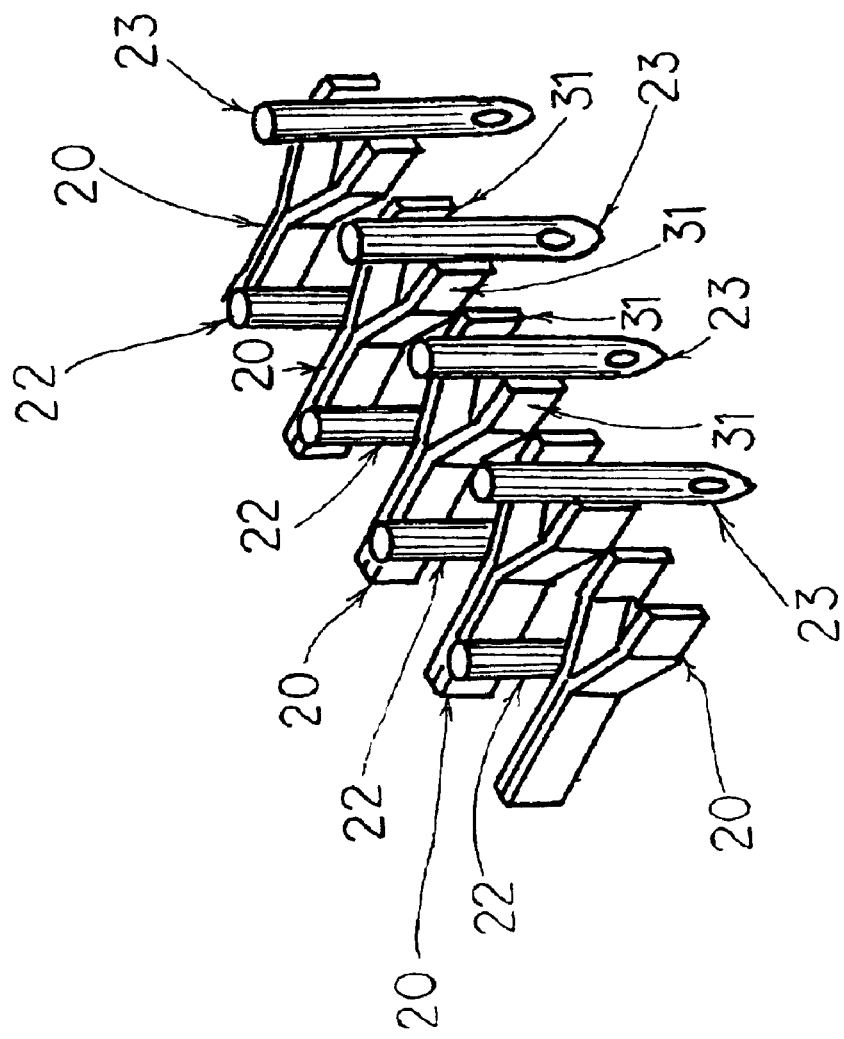

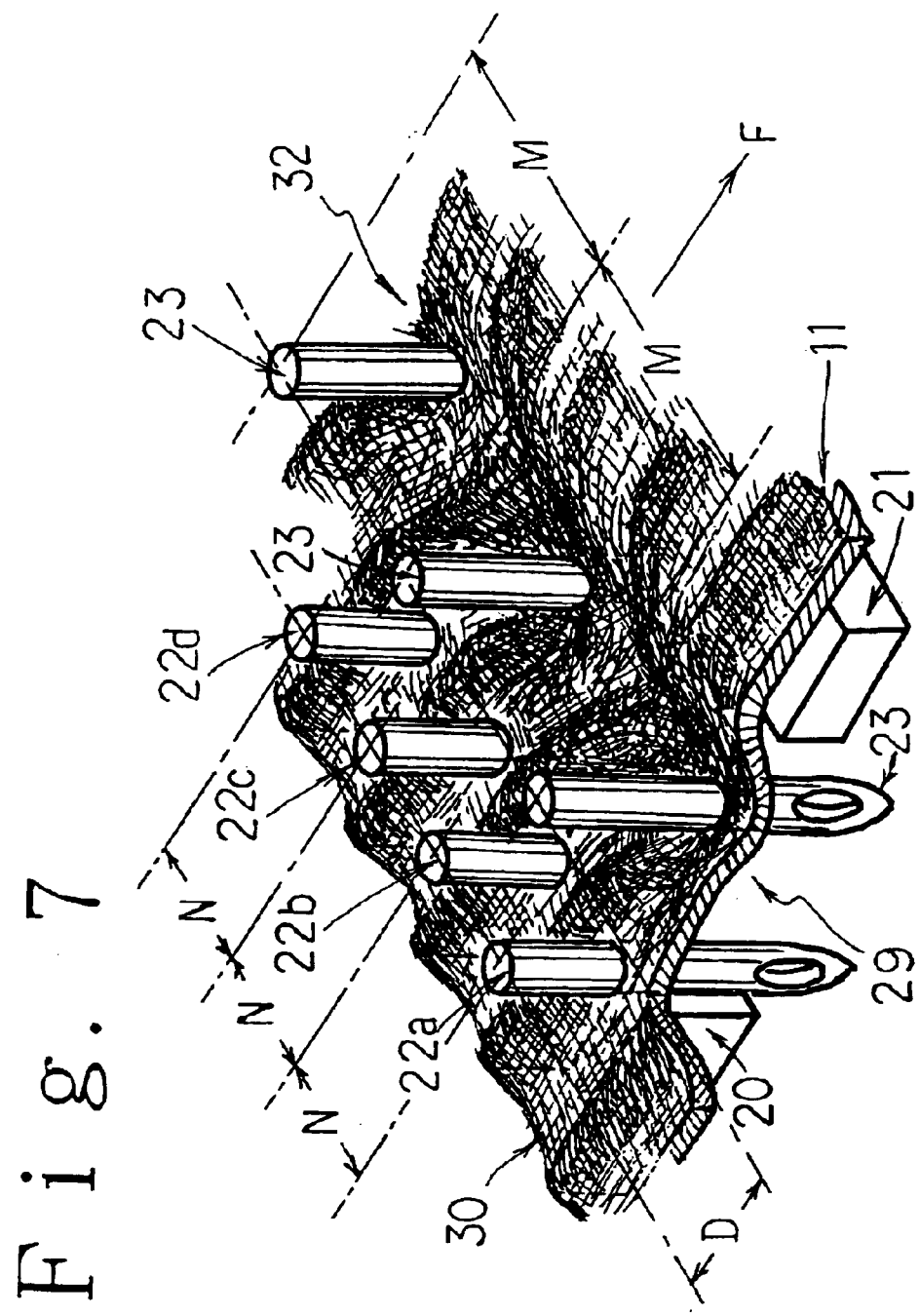

TUFTED CARPET AND BACKING FABRIC

BACKGROUND OF THE INVENTION

1. Field of the Invention

The present invention relates to a tufted carpet. More specifically, the present invention relates to a tufted carpet in which a pile is tufted into a backing fabric woven of multifilament yarns used for warp and weft, and which is so dimensionally stable that it is not damaged when used in busy traffic areas, such as the floor of a vehicular passageway.

2. Discussion of the Related Art

Conventionally, a backing fabric is made of a flat yarn fabric that is woven of flat ribbon monofilament yarns, which are made of such plastics as polypropylene, polyester, and the like.

The flat ribbon monofilament yarn is very thin, like a film. The flat yarn fabric is closely woven without forming an opening among the warps and wefts.

During use of the flat yarn fabric, a needle has to accurately pass through the flat ribbon monofilament yarn. Then a pile is firmly clipped in the interstice that has been pierced in the flat ribbon monofilament yarn by the needle.

Even though the flat yarn fabric is so closely woven as to not form an opening among warps and wefts, it is still light weight and inexpensive due to the flatness and thinness of the warps and wefts. But the flat yarn fabric has a serious fault of being low in tensile strength and dimensional stability, because the tufting process requires that the flat ribbon monofilament yarn be so flat and thin so that it can be easily split and accurately pierced by the needle to form the interstice for clipping the pile.

A polyester multifilament fabric is also conventionally used for the backing fabric. The multifilament fabric is woven of polyester multifilament yarns used for warps and wefts and possesses a stronger tensile strength than the flat yarn fabric. Further, it is well known that the multifilament fabric is superior in flexibility to the flat yarn fabric, since its warp yarns and weft yarns are composed of multifilaments.

However, since the multifilament fabric is superior in flexibility, it tends to be forced in by a needle 22 between adjacent finger needles (20, 20) for supporting a backing fabric (11) in the tufting process, as shown in FIG. 5.

When the multifilament fabric, that is, the backing fabric (11) is forced in between adjacent finger needles (20, 20), longitudinal puckers (30) rise in the multifilament fabric.

In addition to longitudinal puckers (30), transverse puckers (32) also rise in the multifilament fabric during the tufting process for the polyester multifilament fabric on the fine gauge tufting machine (see FIG. 7). The transverse puckers (32) rise in the multifilament fabric (11).

Conventionally, in the fine gauge tufting machine, or in the case of making a needle gauge narrower, the staggered system, where the first needles and the second needles are aligned in a double lines longitudinally front and rear, is applied to the tufting machine, as disclosed in U.S. Pat. No. 4,658,739, the disclosure of which is hereby incorporated by reference.

In the staggered system, each adjacent first needles (22, 22) are partitioned with a finger needle (20) elongated rearward. The end portion (31) of the finger needle (20) diverges into a pair of tines. Each adjacent second needles (23, 23) are partitioned with the tine (31) of the finger needle (20) projecting from the interspace between adjacent first needles (22, 22), shown as in FIG. 6. This kind of diverged finger needle (20) is conventionally applied to various tufting machines of which a needle gauge is ⅛ inch, 5/32 inch, and the like.

In the fine gauge tufting machine of which a needle gauge is less than 1/10 inch, an interspace between adjacent needles is narrower than that of other gauge tufting machines, such as ⅛ inch gauge tufting machine, 5/32 inch gauge tufting machine, and the like. Thus, the finger needle (20) applied to the fine gauge tufting machine should be formed by thinning it in accordance with the interspace between adjacent needles. The finger needle, thus, becomes flexible laterally back and forth in proportion to its thinness.

In regard to the fine gauge tufting machine of which a needle gauge is less than 1/10 inch, it was considered to arrange the three kinds of needles comprising the first needles, the second needles and the third needles, in three lateral lines crossing the direction of the fabric feeding. In this manner, the end portion of the finger needle diverged to project between the adjacent second needles to partition them should be further diverged by bending twice or thrice to project between the adjacent third needles to partition them.

However, such a manner makes the finger needle further flexible laterally back and forth and causes damage to it.

A bed plate (21) has also been disposed behind the second needle (23) in place of the finger needle to support the backing fabric together with piles tufted in it, as shown in FIG. 7.

In this manner, an interspace for arranging the needles (22,23) in a double or three lines longitudinally front and rear should be disposed between the bed plate (21) and the finger needle (20).

As a result, a valley (29) is formed between the bed plate (21) and the finger needle (20). The second needle (23) operates so as to force the backing fabric (11) in the valley (29). Especially, in the case of the backing fabric (11) of the polyester multifilament fabric, it is apt to be forced in the valley (29) by the second needle (23) because it is so flexible.

As a result, in the case of the backing fabric (11) of the polyester multifilament fabric, the transverse pucker (32) is apt to rise in it, shown as in FIG. 7. It is also well known as a way to increase the density of the pile of the tufted carpet to shift the needles laterally back and forth by a half of needle gauge in each tufting cycle.

In this case, not only the needle but also the back stitch of the pile yarn operates so as to force the backing fabric (11) in the valley (29). Besides, height (H) of the pile can be varied in accordance with a distance (P) between the backing fabric (11) and the looper (28). And, when the backing fabric (11) is forced in the valley (29) between the bed plate (21) and the finger needle (20), the distance (P) between the backing fabric (11) and the looper (28) varies. As a result, it induces an irregulation in height (H) of the pile causing faults over the pile surface of the tufted carpet.

To eliminate these faults caused by the longitudinal pucker (30), the transverse pucker (32) and the irregulation in height (H) of the pile, attempts have been made to set the backing fabric (11) by treating it with a binding resin. These faults occur when using the polyester multifilament fabric in place of the flat yarn fabric for the backing fabric.

The use of the polyester multifilament fabric in place of the flat yarn fabric is required when a high tensile strength is required to the tufted carpet. And, in the case of the polyester multifilament fabric to which the high tensile strength is required, it is also typically required to increase both densities of warp and weft. However, if the high density polyester multifilament fabric is impregnated with a liquid binding resin, the warps and the wefts are so firmly fixed together at their intersections that the warps and the wefts can not easily slip aside when the needle threads into the polyester multifilament fabric in the tufting process. Thus, a backing fabric reinforced by impregnating with a liquid binding resin makes the tufting operation difficult.

Since the backing fabric is continuously transferred by feeding in the longitudinal direction. And, when the needle is threaded into the backing fabric, the backward and forward movement of the backing fabric at the threaded portion is stopped momentarily and partially by the needle. In such a situation, the backing fabric is loosened in the front side in the feeding direction (F) and is stretched in the opposite rear side. In other words, in the feeding direction (F), the needle is pushed out in the front side and is pulled out in the opposite rear side by the backing fabric.

As a result, the fine needle applied to the fine gauge tufting machine tends to be easily bent toward the feeding direction (F) of the backing fabric, fractured and damaged. However, in this situation, if the weft yarn slips aside pushed back by the needle and moves in the opposite direction against the fabric feeding, the reaction which operates from the weft yarn against the needle is to be decreased in accordance with the distance of the movement of the weft yarn, and therefore, the damage to the needle is reduced.

From the above-mentioned reasons, the manner of reinforcing the polyester multifilament fabric with a liquid binding resin is not suitable to avoid such problems as the longitudinal pucker (30), the transverse pucker (32) and the irregulation in height (H) of the pile, all of which occur in the fine gauge tufting machine. For reference, there are disclosed the backing fabrics reinforced with the binding resin in Japanese Patent No. 2727097 (Japanese Patent Laid Open No.2-161915), Japanese Utility Model Laid Open No. 54-82168 and Japanese Utility Model Publication No. 2-47875 (Japanese Utility Model Laid Open No.59-120982).

In the Japanese Patent No.272097 (Japanese Patent Laid Open No.2-161915), the coarse woven fabric comprised of monofilament yarns of 165 dtex to 8800 dtex, which is composed of thermo adhesible polymer and non thermo adhesible polymer is used for the backing fabric. After the tufting process, the backing fabric is heated to melt the thermo adhesible polymer, and then the pile is fixed on the backing fabric through the fused thermo adhesible polymer.

In the Japanese Utility Model Laid Open No. 54-82168, the pile is tufted to the backing fabric which is made of thermo adhesible fibers and the non-thermo adhesible fibers. After the tufting process, the backing fabric is heated to melt the thermo adhesible fibers, and the pile is then fixed on the backing fabric through the fused thermo adhesible fibers.

In the Japanese Utility Model Publication No. 2-47875 (Japanese Utility Model Laid Open No. 59-120982), the pile is tufted to the backing fabric which is made of conjugate-fiber of thermo adhesible polymers and non-thermo adhesible polymers. After the tufting process, the backing fabric is heated to melt the thermo adhesible polymers, and the pile is then fixed on the backing fabric through the fused thermo adhesible polymers. The manner of applying the thermo adhesible materials to the backing fabric is known.

However, in the prior art, none of the thermo adhesible materials is melted or fixed on anything before the tufting process. That is, before the tufting process, the thermo adhesible materials have not operated as an adhesive or a binding agent. Thus, these thermo adhesible materials do not damage the needle. On the other hand, these thermo adhesible materials do not reduce the flexibility of the backing fabric to a minimum before the tufting process, nor do they operate as a means for dissolving the problems of the longitudinal pucker (30), the transverse pucker (32) and the irregulation in height (H) of the pile, all of which occur in the tufting process.

Further, in Japanese Utility Model Laid Open No. 2-111372, there is disclosed a backing fabric woven of a flat ribbon monofilament yarn that is made of the matrix material of non-thermo adhesible polymer covered with the segment material of thermo adhesible polymer, where warp yarns and weft yarns are fixed together through the thermo adhesible polymer.

However, this backing fabric is used only for manufacturing artificial turf in which the pile is made of a flat ribbon monofilament yarn and is tufted with a rough gauge tufting machine. A pair of flat ribbon monofilament yarns, which are the warp yarn and the weft yarn crossing at the intersection of the fabric, become firmly fixed together by facing each other. Thus, such a backing fabric of which the warp yarn and the weft yarn are fixed can not be used in a fine gauge tufting machine.

Thus, the Japanese Utility Model Laid Open No.2-111372 does not neither teach nor suggest a manner of overcoming the problems of the longitudinal pucker (30), the transverse pucker (32) and the irregulation in height (H) of the pile, all of which occur in the tufting process where the multifilament fabric is used for backing fabric and a fine gauge tufting machine is used.

Of course, in the fine gauge tufting machine, it is theoretically possible to overcome the abovementioned problems by making the finger needle thinner and by making the needle and the pile yarn finer in accordance with the needle gauge.

However, in the case of using a fine pile yarn prepared with a finer needle gauge, even if such a thin tufted pile fabric as moquette, velvet, plush, corduroy, and the like, which are suitable to use for clothing, tablecloth, and the like, may be obtained. However, a thick tufted pile fabric, which is suitable for carpet to cover the floor, especially the floor of a vehicular passageway, can not be obtained. Thus, making the finger needle thinner and making the needle and the pile yarn finer will not produce a carpet that may be used in busy traffic areas, such as the floor of a vehicular passageway Accordingly, it is an object of the present invention to provide a woven backing fabric that is made of multifilament yarns in warps and wefts, that overcomes the problems of the longitudinal pucker, the transverse pucker, the irregulation in height of the pile, the distortion of the pattern, and the like, all of which occurred in the tufting process where the multifilament fabric is used for the backing fabric and the fine gauge tufting machine, of which the needle gauge of less than $\frac{1}{12}$ inch is used. It is a further object of the present invention to provide a carpet that is tufted by using a fine gauge tufting machine, of which the needle gauge is less than $\frac{1}{12}$ inch, and by applying a thick pile yarn of 800–6000 dtex, and improved in the tensile strength and the dimensional stability so as to be suitable to cover the busy traffic areas, such as the floor of a vehicular passageway.

SUMMARY OF THE INVENTION

These and other objects are achieved in accordance with the present invention with a backing fabric that is woven by using the multifilament yarns for the warps and wefts. A binding resin sticks on the filaments that make up the wefts. The filaments which make up the wefts are, therefore, partially fixed to one another through the binding resin. The warps and the wefts are partially fixed through the binding resin sticking on the filament of the wefts. The backing fabric in accordance with the present invention is further characterized as using a thermo adhesible resin and/or a thermo adhesible fiber as the binding resin. The backing fabric is further characterized in that the amount of binding resin including the thermo adhesible resin and the thermo adhesible fiber is set up from 10 to 50 bulk percent of the multifilament yarn which makes up the weft.

The bulk of the binding resin including the thermo adhesible resin and the thermo adhesible fiber and the bulk of the multifilament yarn are calculated by dividing their amount of weight by their specific gravity.

The tufted carpet in accordance with the present invention is preferably characterized as follows:

the first pile yarns that are arranged with the needle gauge (N) of from ⅛ inch (i.e., $2.54/8$ cm) to 1/10 inch (i.e., $2.54/10$ cm) and the second pile yarns that are arranged with the needle gauge (M=2N) of twice of the needle gauge (N) of the first pile yarn are tufted by arranging the first pile yarns and the second pile yarns in a double lines longitudinally front and rear;

each second pile that is made of second pile yarn lies between the adjacent first piles;

the backing fabric is woven by using the multifilament yarns for the warps and wefts;

the binding resin sticks on the filaments which make up the wefts;

the filaments which make up the wefts are partially fixed to one another through the binding resin; and the warps and the wefts are adhered through the binding resin sticking on the filament of the wefts.

The tufted carpet in accordance with the present invention is further characterized as having the wefts of numbers from 2 to 5 lie respectively between two first piles in the stitch row of the first pile yarn and between two second piles in the stitch row of the second pile yarn, which are respectively adjacent front and rear in the longitudinal direction (F). The tufted carpet in accordance with the present invention is further characterized as having the thickness of the first pile yarn and the second pile yarn set up from 800 dtex to 6000 dtex.

BRIEF DESCRIPTION OF THE DRAWING

FIG. 6 is an enlarged partial perspective view of the finger needle on a conventional tufting machine; and FIG. 7 is an enlarged partial perspective view of a conventional backing fabric on a tufting machine.

Figure 1:
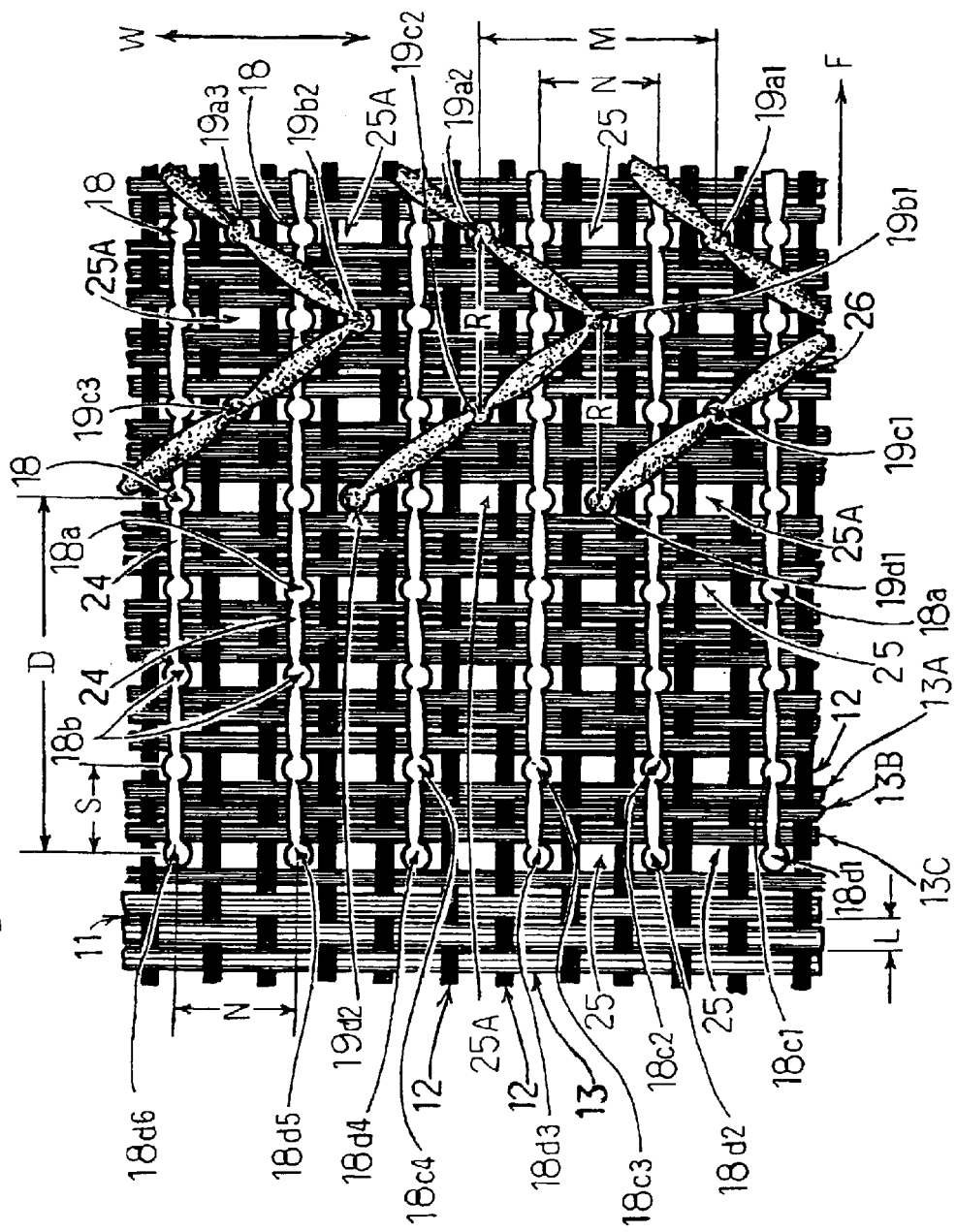
FIG. 1 is a bottom view of the backing fabric and the tufted carpet formed from the first pile yarns and the second pile yarns according to the present invention.

DETAILED DESCRIPTION OF THE PRESENTLY PREFERRED EXEMPLARY EMBODIMENT OF THE PRESENT INVENTION

On the tufting machine, a plurality of needles are divided into two groups, the first needles 22 and the second needles 23 each of which is laterally alined in a double lines longitudinally front and rear by spacing a distance (D) between them. The first needles (22) disposed at the front side are arranged with the needle gauge (N) of ⅛ inch (i.e., $25.4/8$ cm). The second needles (23) disposed at the rear side are arranged with the needle gauge (M) of ¼ inch (i.e., $25.4/4$ cm). The pile yarns of 3850 dtex are fed to the first needle (22) and the second needle (23). Adjacent first needles (22, 22) are separated by a finger needle (20). A bed plate (21) is disposed behind the second needle (23), in place of the finger needle (20), for supporting the backing fabric (11) together with the piles tufted in it by first needle (22) and by second needle (23).

Figure 2:
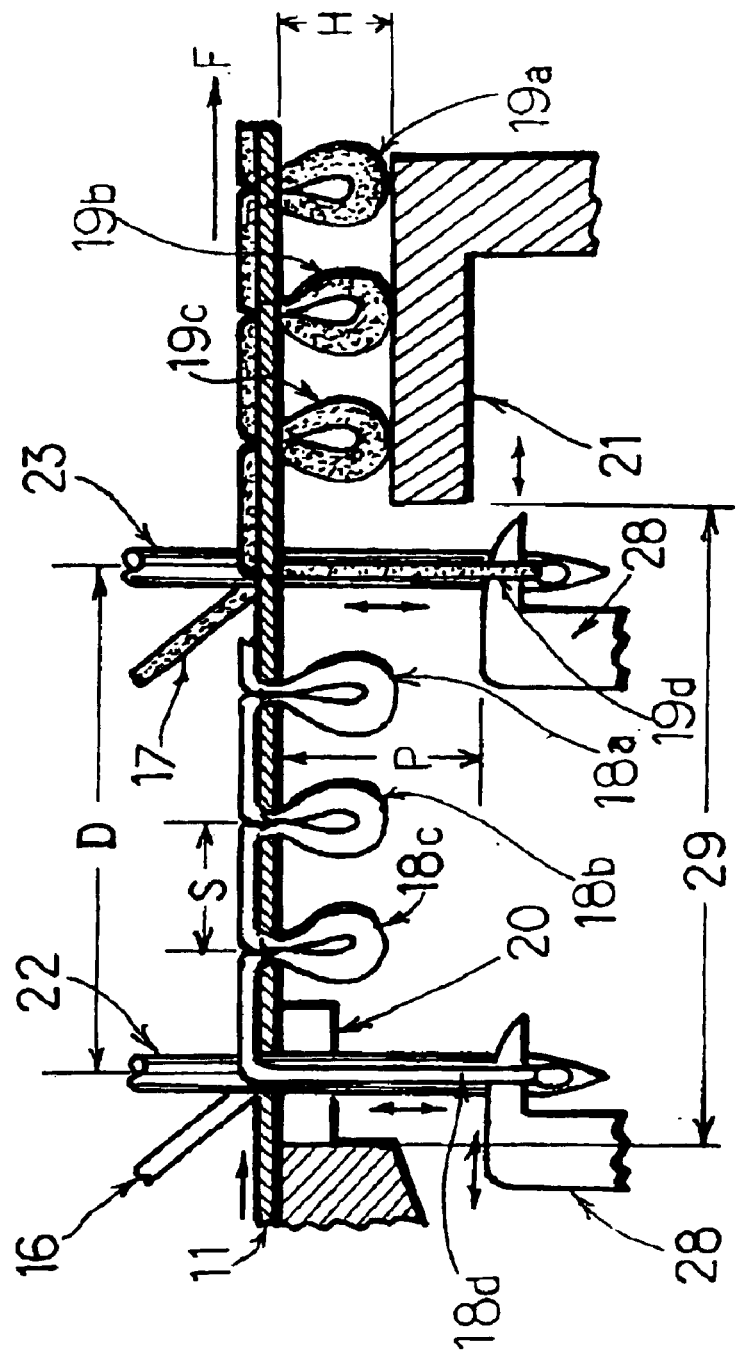
FIG. 2 is a side view of the backing fabric and the tufted carpet formed from the first pile yarns and the second pile yarns on the tufting machine according to the present invention.

An interspace is disposed between the bed plate (21) and finger needles (20) for arrangement of first needles (22) and second needles (23) in a double line longitudinally front and rear. The interspace forms a valley (29) between the bed plate (21) and the finger needle (20). In the case shown in FIGS. 1–3, the stitch gauge (S=3L) is illustrated as being set up treble the picking repeat (L) of the weft (13). The distance (D=4L) of the interspace between the first needle (22) and the second needle(23) is illustrated as being set up four times the picking repeat (L) of the weft (13). Every second needle (23) is disposed as to contact the middle portion between a pair of adjacent first needles (22a22b) as shown in FIG. 7. In FIGS. 1 and 2, in one tufting cycle, the first set of piles (19a1, 19a2, 19a3) are tufted simultaneously. In the succeeding second tufting cycle, the first set of piles (18b, 18b) and the second set of piles (19b1, 19b2) are also tufted simultaneously. In the succeeding third tufting cycle, the first set of piles (18c1, 18c2, 18c3) and the second set of piles (19c1, 19c2, 19c3) are also tufted simultaneously. In the succeeding fourth tufting cycle, the first set of piles (18d1, 18d2, 18d3, 18d4, 18d5, 18d6) and the second set of piles (19d1, 19d2) are also tufted simultaneously. In each tufting cycle, the second needles (23, 23) are operated by shifting laterally back or forth (W) by a half of the needle gauge (M) of the second set of pile yarns (17,17), which is set up twice the needle gauge (N) of the first set of pile yarns (16. 16).

Then, as shown in FIG. 1, in the one tufting cycle, the second set of piles (19a1, 19a2, 19a3) are tufted with the needle gauge (M=2N) of twice the needle gauge (N) of the first set of piles (18a, 18a) and arranged in double lines in the longitudinal direction (F) of the backing fabric (11) together with respect to the first set of piles (18a, 18a), and every second pile (19a1, 19a2, 19a3) lies between any one of a pair of adjacent first set of piles (18, 18) which are adjacent in the lateral direction (W) of the backing fabric (11). In the succeeding second tufting cycle, as shown in FIG. 1, the second set of piles (19b1, 19b2) are tufted with the needle gauge (M=2N) of twice the needle gauge (N) of the first set of piles (18b, 18b) and arranged in double lines in the longitudinal direction (F) of the backing fabric (11) together with respect to the first set of piles (18b, 18b), and every second pile (19a1, 19a2) lies between any one pair of adjacent first set of piles (18. 18) which are adjacent in the lateral direction (W) of the backing fabric (11). In the succeeding third tufting cycle, as shown in FIG. 1, the second set of piles (19c1, 19c2, 19c3) are tufted with the needle gauge (M=2N) of twice the needle gauge (N) of the first set of piles (18c1, 18c2, 18c3) and arranged in double lines in the longitudinal direction (F) of the backing fabric (11) together with respect to the first set of piles (18c1, 18c2, 18c3), and every second pile (19c1, 19c2, 19c3) lies between any one of a pair of adjacent first set of piles (18, 18) which are adjacent in the lateral direction (W) of the backing fabric (11). In the succeeding fourth tufting cycle, as shown in FIG. 1, the second set of piles (19d1, 19d2) are tufted with the needle gauge (M=2N) of twice the needle gauge (N) of the first set of piles (18d1, 18d2, 18d3, 18d4, 18d5, 18d6) and arranged in double lines in the longitudinal direction (F) of the backing fabric (11) together with respect to the first set of piles (18d1, 18d2, 18d3, 18d4, 18d5, 18d6), and every second pile (19d1, 19d2) lies between any one of a pair of adjacent first set of piles (18, 18) which are adjacent in the lateral direction (W) of the backing fabric (11).

Figure 3:
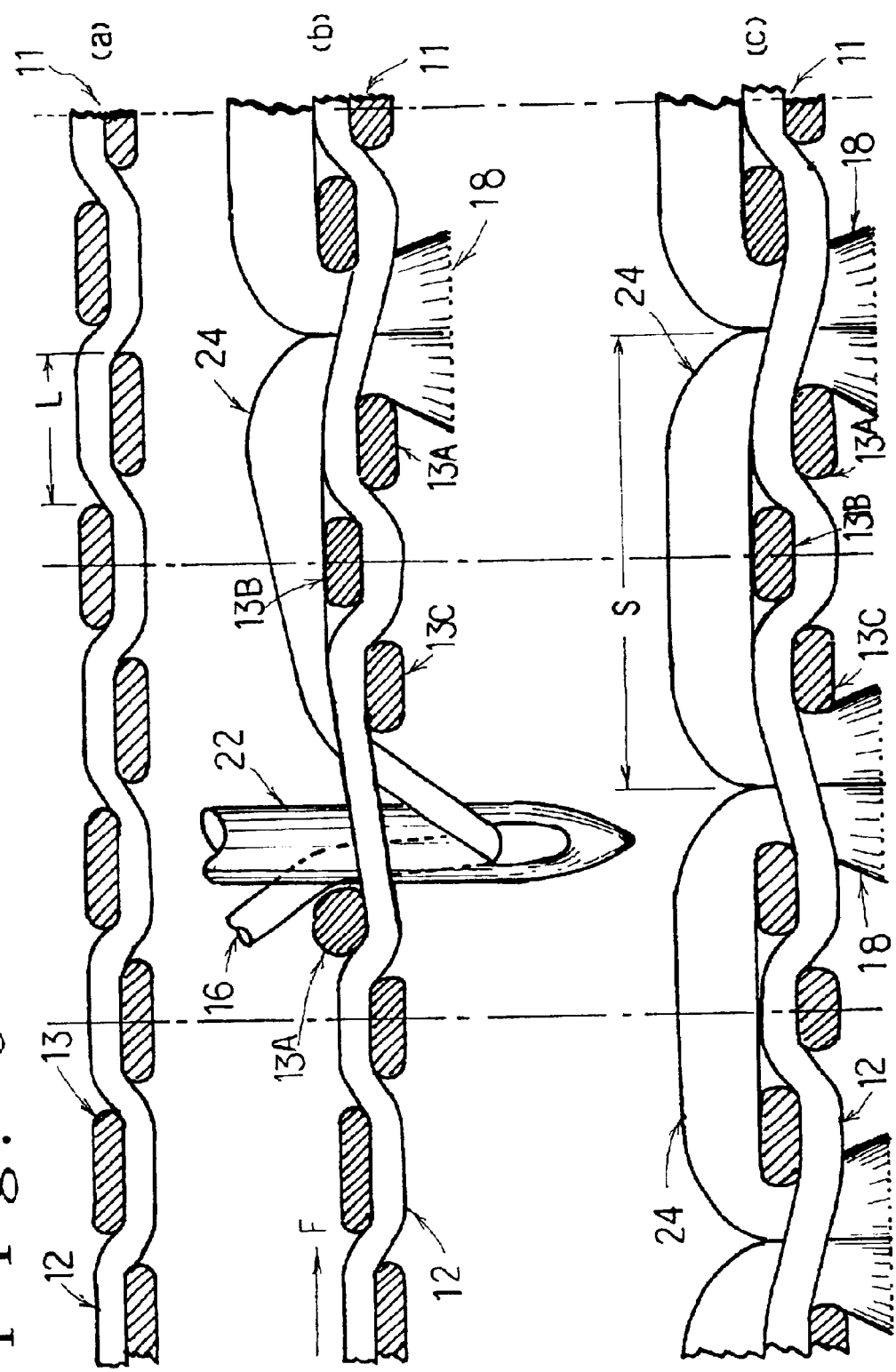
FIG. 3 is an enlarged side view of the backing fabric according to the present invention, wherein portion (a) shows a before tufting situation, portion (b) shows a tufting situation; and portion (c) shows an after tufting situation.

In the case shown in FIGS. 1–3, since the stitch gauge (S=3L) is set up treble the picking repeat (L) of the weft (13), every first pile (18) in every stitch row of the first pile yarn (16) and every second pile (19) in every stitch row of the second nile yarn (17) are respectively tufted in a ratio of one to three wefts. That is, three wefts lie between every adjacent first piles (18, 18) which were tufted and then adjacent in the same stitch row of the first pile yarn (16). And, three wefts lie between every adjacent second piles (19, 19) which were tufted and then adjacent in the same stitch row of the second pile yarn (17).

In one example, the backing fabric (11) was woven by using a polyester multifilament yarn for the warp (12) and the weft (13) with a density of the warp of 26 ends per inch (i.e., 26 ends/2.54 cm) and with a density of the weft of 25 pickers per inch (i.e, 25 pickers/2.54 cm).

Figure 4:
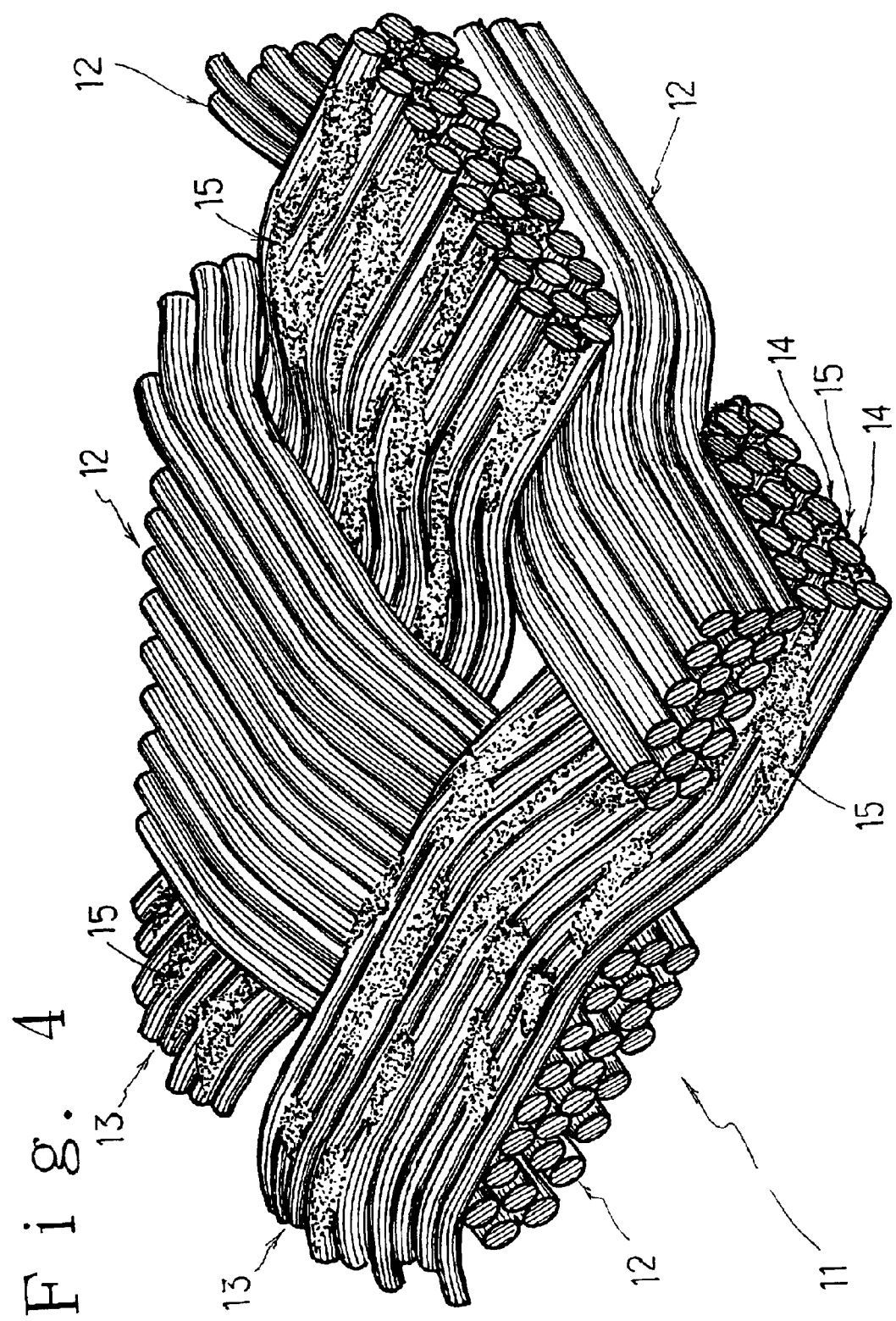
FIG. 4 is an enlarged partial perspective view of the backing fabric according to the present invention.
Figure 5:
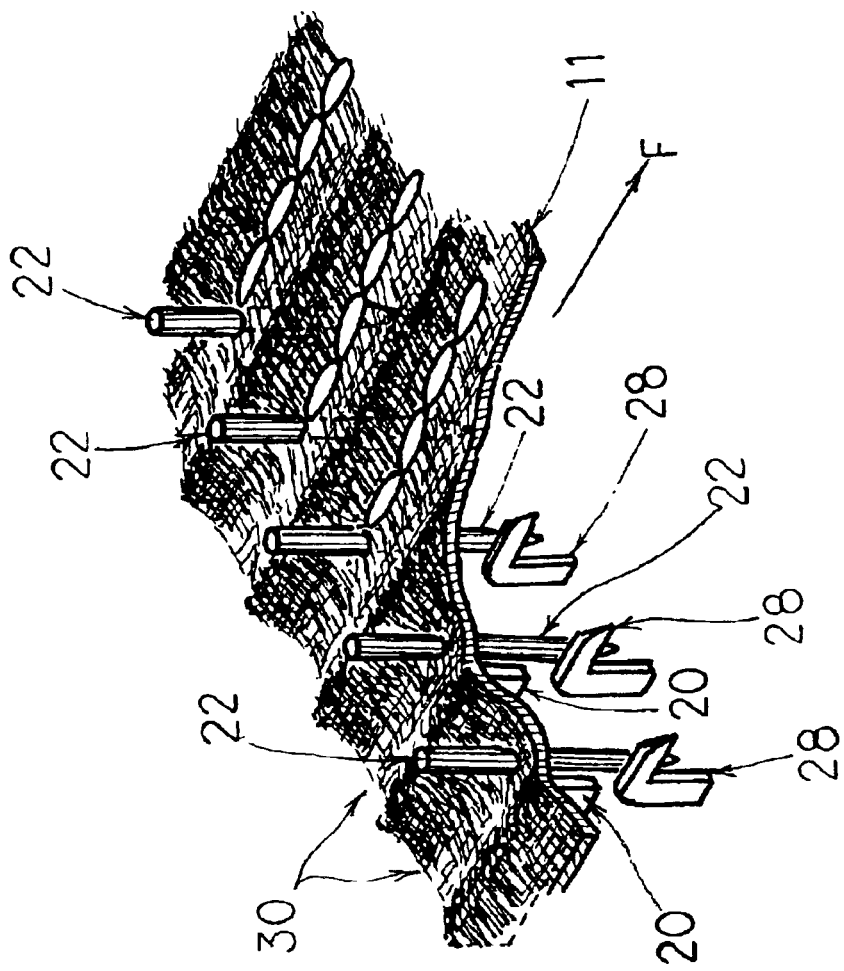
FIG. 5 is an enlarged partial perspective view of the conventional backing fabric.

FIG. 4 shows, in perspective, the intersection of the warp yarns (12) and the weft yarns (13) in the backing fabric. The non-thermo adhesible polyester multifilament yarn of 825 d tex/192 filament was prepared to use for the warp yarn (12) in this example. The weft yarn (13) was prepared by mixing the non-thermo adhesible polyester multifilament yarn of 1100 dtex/250 filaments and the spun yarn of 275 dtex composed of the thermo adhesible polyester fiber, melting point 110° C., of 1.65 d tex (i.e., the total numbers of the thermo adhesible polyester fiber is 167 filaments and the amount of the thermo adhesible polyester fiber was set up 25 bulk percent [275×100/1100] of the non-thermo adhesible polyester multifilament yarn).

Before the tufting process, the backing fabric was preheated at 180° C., and subsequently treated at 225° C. Consequently, the thermo adhesible polyester fiber fused, turned into the binding resin (15), and stuck on the non-thermo adhesible polyester multifilament (14) of the wefts (13). As a result, the non-thermo adhesible polyester filaments (14, 14), which make up the wefts (13), were partially fixed to one another with the binding resin (15). Simultaneously, the wefts (13) and the warps (12) were fixed to each other at their intersection through the binding resin (15). The thermo adhesible fiber can be comprised of the thermo adhesible polymer only. But the thermo adhesible fiber may be a conjugate fiber comprised of a thermo adhesible polymer and a non-thermo adhesible polymer. For example, the sheath core type conjugate fiber may be comprised of the thermo adhesible segment polymer and the non-thermo adhesible matrix polymer.

When the filaments (14, 14) composing the weft (13) were partially fixed to one another with the binding resin (15), the binding resin (15) increases a tensile strength of the weft (13), and as a result, the weft (13) becomes wiry like a bamboo stick. Thus, in the tufting process, the backing fabric (11) is not easily forced in between adjacent finger needles (20, 20), thereby effectively eliminating the longitudinal puckers (30) from rising in the backing fabric (11).

It is preferable to set up the amount of resin (15) to mix to be from 10 to 50 bulk percent of the weft (13).

Since the binding resin (15) is mixed and distributed inside of the weft (13), all filaments (14, 14) are firmly fixed to one another. On the other hand, since a little amount of the binding resin (15) which partially distributes only on the surface of the weft (13) attaches and adheres to the warp (12), the adhesion between the warp (12) and the weft (13) only occurs at various points. That is, the warp (12) and the weft (13) are not fixed to each other over the whole surface of contact as in the case of Japanese Utility Model Laid Open No. 2-111372. Thus, when the needle pushes the warp (12) and the weft (13) in the tufting process, the warp (12) and the weft (13) are easily separated away at the intersection on the backing fabric.

In a staggered tufting machine, where the needles (22, 23) are aligned in a double line front and rear, as disclosed in U.S. Pat. No. 4,658,739, the disclosure of which is hereby incorporated by reference, every weft (13) is to contact the first needle (22) first, and the second needle (23) next. That is, every weft (13) is to contact the needle twice in total. When the first needle (22) touches the weft (13), the weft (13) slips aside due to being pushed back by a needle (22) and moves in parallel with other adjacent wefts (13) in the opposite direction against the fabric feeding direction (F). As a result, the crevice (25), which is surrounded with the adjacent wefts (13, 13) and the adjacent backstitches (24, 24) of the first pile yarn (18), is formed. When the amount of the binding resin (15) is set up less than 10 bulk percent of the weft (13), the weft (13) does not become as wiry, and does not move to such a degree in parallel with other adjacent weft (13). Thus, the comparatively large crevice (25) is not formed.

On the other hand, when the amount of the binding resin (15) is set up more than 50 bulk percent of the weft (13), the warp (12) and the weft (13) do not separate from each other easily. Thus, a comparatively large crevice (25) is not formed in this situation either.

When the warp (12) and the weft (13) separate from each other, the binding resin (15) remains and makes their surfaces rough. In addition, the first pile (18) lies between the adjacent wefts (13, 13) moved by the needle respectively as if the first pile (18) cleft them both in front and in rear.

So that the crevice (25) remains open. In this case, if the stitch gauge were set up treble, the picking repeat of the weft (13), the distance of the interspace between the first needle (22) and the second needle (23) were set up four times the picking repeat of the weft (13), the needle gauge of the second needle were set up twice the needle gauge of the first needle (22), and every second needle (23) were disposed as to contact the middle portion between adjacent first needles (22, 22), the second needle (23) would be threaded through the crevice (25) formed as a result of threading of the first needle (22).

And then, the powerful reaction does not operate from the backing fabric (11) to the second needle (23).

If the stitch gauge were set up treble the picking repeat of the weft (13), one end of the weft (13B) which can not contact each of the first needle (22) and the second needle (23) is to lie between adjacent first piles (18,18) respectively formed in the same stitch row of the same first pile yarn (16) and also between adjacent second piles (19, 19) respectively formed in the same stitch row of the same second pile yarn (17).

Such weft (13B), since it does not contact any needle, is not peeled away from the warp (12) and remains in the adherent situation in connection with the warp (12). So that, the dimensional stability of the backing fabric is maintained by weft (13B). Thus, it is desirable to set up the stitch gauge (S) several integral times the picking repeat (L) so that from 2 ends to 5 ends of the weft (13A,13B,13C . . . ) lie between adjacent first piles (18, 18) and between adjacent second piles (19, 19) which were formed in the same stitch row of the same first pile yarn (16) and the same second pile yarn (17), respectively. Thus, the second needle (23) does not force the backing fabric (11) in the valley (29) disposed between the bed plate (21) and the finger needle (20). Therefore, the transverse pucker (32) does not tend to rise in the backing fabric (11). Such weft (13B), since it does not contact any needle, is not peeled away from the warp (12) and remains in the adherent situation in connection with the warp (12). So that, the dimensional stability of the backing fabric is maintained by weft (13B). Thus, it is desirable to set up the stitch gauge (S) several integral times the picking repeat (L) so that from 2 ends to 5 ends of the weft (13A,13B,13C . . . ) lie between adjacent first piles (18, 18) and between adjacent second piles (19, 19) which were formed in the same stitch row of the same first pile yarn (16) and the same second pile yarn (17), respectively. Thus, second needle (23) does not force the backing fabric (11) in the valley (29) disposed between the bed plate (21) and the finger needle (20). Therefore, the transverse pucker (32) does not tend to rise in the backing fabric (11). And, the irregularity in height (H) of the second pile (19) is also avoided.

In the exemplary embodiment of the present invention, the first needles (22, 22), which the weft (13) is to make contact with first, were arranged with the needle gauge (N) of ⅛ inch ($^{2.54}/_{8}$cm). And, the second needles (23, 23) were disposed at the rear side against the first needle (22), and were arranged with the needle gauge (M) of ¼ inch (i.e. $^{2.54}/_{4}$cm).

After the operation of the second needle (23), some of the crevices (25A) are to be left on in the opening situation between adjacent second piles (19, 19). That is, all the adjacent second piles (19, 19) can not be threaded into all crevices (25, 25) which were opened by the first needle (22). However, in fact, some of the crevices (25A), which are to be left on, are to be substantially re-closed by being pinched between adjacent second piles (19, 19).

Especially, when the second needles (23, 23) are operated by shifting laterally back and forth (W) by a half of those needle gauge (M) in each tufting cycle, the crevices (25A) are not consecutively left on along the feeding direction (F) of the backing fabric (11).

Additionally, the warp (12), which adjoin the sides of each crevice (25), tend to be pushed out by the back stitch (26) of the second pile yarn (17) in the lateral shifting direction (W). Thus, the crevice (25A) is re-closed by the warp (12).

In addition, in each space between adjacent stitch rows of the first pile (18), the second pile (19) is tufted with the repeat (R=2S) of twice the stitch gauge (S) of the first pile (18). As a result, the density of the pile becomes even all over the pile surface of the tufted carpet.

In putting the present invention into practice, it is possible to duplicate a high low pattern over the pile surface by selectively varying the tension of the first pile yarn (16) or the second pile yarn (17), and thereby varying the amount of pile yarn (16 or 17) fed to the needle (22 or 23) in every tufting cycle, thereby varying the height of the pile.

It is also possible to duplicate a colorful pattern over the pile surface by varying the color of the first pile yarn (16) and the second pile yarn (17).

In accordance with the present invention, the weft (13) is reinforced by the binding resin (15), and the weft (13) and the warp (12) are fixed to each other, and consequently the flexibility of the backing fabric (11) is restrained by the binding resin (15). Thus, the backing fabric (11) can not be forced in, neither between adjacent finger needles (20, 20) nor in the valley (29) disposed between the bed plate (21) and the finger needle (20). Consequently, the longitudinal puckers (30) and the transverse puckers (32) do not rise in the backing fabric (11). Also, the irregulation in height (H) of the pile is reduced, since the backing fabric (11) is not forced in the valley (29) between the bed plate and the finger needle.

Before the tufting process, the warp (12) and the weft (13) are pivotally and weakly fixed through a relatively small amount of binding resin (15), which partially distributes only on the surface of the weft (13). Thus in the tufting process, when the weft (13) contacts the needle (22 and/or 23), the weft (13) easily peels up and is separated away from warp (12). As a result, needles (22 and 23) are not damaged by the reaction which is to operate from the weft (13) against the needles (22 and 23) in the feeding direction (F) of the backing fabric. A tufted carpet that does not have the longitudinal puckers (30) and the transverse puckers (32), has a pile (H) that is even, and has a superior tensile strength and dimensional stability than those tufted carpets that do. In addition, this tufted carpet is suitable to use in busy traffics, such as in a vehicular passageway.

In accordance with a further aspect of the present invention, since the thermo adhesible fiber is used as the binding resin (15), the binding resin (15) can be easily and uniformly mixed and dispersed in weft (13). Thus, it is possible to partially fix filaments (14,14) to one another and to fix the warp (12) and the weft (13) pivotably, yet peelably and weakly.

In accordance with another aspect of the present invention, the binding resin (15) does not make the weft (13) and the backing fabric (11) so solid that they can not be easily separated when the needle (22 and/or 23) touches them. Thus, there does not occur any demerit nor damage to the needles due to the use of the binding resin (15).

In accordance with yet another aspect of the present invention, the tufting operation with the second needle (23) becomes relatively easy. Also, during the tufting process, the backing fabric (11) is not pushed down toward the looper side (28) by the needles. Additionally, the resistance from the backing fabric (11) to the needle decreases.

As the multifilament fabric, which is superior in the tensile strength and dimensional stability to the flat yarn fabric, is used for the backing fabric, the tufted carpet is not damaged when used in busy traffics, such as in a vehicular passageway.

In accordance with yet another aspect of the present invention, because some of wefts (13B) remain intact, the dimensional stability of the backing fabric (11) is substantially maintained during the tufting process.

After tufting with the first pile yarn (16), the second pile yarn (17) is to be tufted again, there does not occur any fault, such as the longitudinal pucker (30), the transverse pucker (32), the irregulation of height (H) of the pile, and the like.

In accordance with still yet a further aspect of the present invention, since thick yarn of 800 to 6000 dtex is used for the pile yarn (16 and/or 17), the tufted carpet produced in accordance with the present invention is suitable for use in busy traffics, such as a vehicular passageway.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A tufted carpet comprising:
   a backing fabric comprising:
   a plurality of warps, each of said warps being comprised of a plurality of filaments;
   a plurality of wefts, each of said wefts being comprised of a plurality of filaments and a binding resin mixed and distributed therein and partially on the surface thereof; and
   said binding resin partially sticking on each of said filaments of said wefts and partially fixing each of said filaments of said wefts with one another, and partially fixing said warps and said wefts to each other;
   a first set of piles made of a first pile yarn, the first set of piles being tufted to the backing fabric with a needle gauge ranging from ⅛ inch to ¹/₁₀ inch; and
   a second set of piles made of a second pile yarn, the second set of piles being tufted to the backing fabric with a needle gauge of twice the needle gauge of the first set of pile yarns and arranged in double lines longitudinally front and rear in the longitudinal direction of the backing fabric together with respect to the first pile yarns set of piles, and disposed each one of the second set of piles lies between any one pair of adjacent ones of the first piles first set of piles which are ajacent in the lateral direction of the backing fabric.

2. A tufted carpet as recited in claim 1, wherein two to five threads of the wefts lie between all piles which are adjacent ones of the first set of piles tufted in the same stitch row of the first set of piles of pile yarn and are also lie disposed between all piles which are adjacent ones of the second set of piles tufted in the same stitch row of the second set of piles of pile yarn.

3. A tufted carpet as recited in claim 1, wherein a thickness of the first pile yarn and the second pile yarn ranges from 800 dtex to 6000 dtex.

4. A tufted carpet comprising:
   a backing fabric comprising:
   a plurality of warps, each of said warps being comprised of a plurality of filaments;
   a plurality of wefts, each of said wefts being comprised of a plurality of filaments and a binding resin mixed and distributed therein and partially on the surface thereof; and
   said binding resin partially sticking on each of said filaments of said wefts and partially fixing each of said filaments of said wefts with one another, and partially fixing said warps and said wefts to each other;
   a first set of piles made of a first pile yarn, the first set of piles being tufted to the backing fabric with a needle gauge ranging from ⅛ inch to ¹/₁₀ inch; and
   a second set of piles made of a second pile yarn, the second set of piles being tufted to the backing fabric with a needle gauge of twice the needle gauge of the first set of piles and arranged in double lines perpendicular to the feed direction, and disposed such that the line of the second pile yarn is parallel to the line of the first pile yarn, and each pile of the second pile yarn is disposed between adjacent piles of first pile yarn.

5. A tufted carpet comprising:
   a backing fabric comprising:
   a plurality of warps, each of said warps being comprised of a plurality of filaments;
   a plurality of wefts, each of said wefts being comprised of a plurality of filaments and a binding resin mixed and distributed therein and partially on the surface thereof; and
   said binding resin partially sticking on each of said filaments of said wefts and partially fixing each of said filaments of said wefts with one another, and partially fixing said warps and said wefts to each other;
   a first set of piles made of a first pile yarn, the first set of piles being tufted to the backing fabric with a needle gauge ranging from ⅛ inch to ¹/₁₀ inch; and
   a second set of piles made of a second pile yarn, the second set of piles being tufted to the backing fabric with a needle gauge of twice the needle gauge of the first set of piles and arranged in double lines perpendicular to the feed direction, and disposed such that the line of the second pile yarn is parallel to the line of the first pile yarn, and each pile of the second pile yarn is disposed between adjacent piles of first pile yarn; and two to five wefts lie between all piles which are adjacent in the same stitch row of the second set of piles of yarn.

* * * * *